US012717060B2

(12) United States Patent
Bongs et al.

(10) Patent No.: US 12,717,060 B2
(45) Date of Patent: Aug. 25, 2026

(54) PREPARATION OF COLD ATOM CLOUDS FOR MEASURING GRAVITY GRADIENT

(71) Applicant: The University of Birmingham, Birmingham (GB)

(72) Inventors: Kai Bongs, Birmingham (GB); Mehdi Langlois, Birmingham (GB); Luuk Earl, Birmingham (GB); Michael Holynski, Birmingham (GB)

(73) Assignee: The University of Birmingham, Birmingham (GB)

( * ) Notice: Subject to any disclaimer, the term of this patent is extended or adjusted under 35 U.S.C. 154(b) by 318 days.

(21) Appl. No.: 18/264,951

(22) PCT Filed: Feb. 11, 2022

(86) PCT No.: PCT/GB2022/050384
§ 371 (c)(1),
(2) Date: Aug. 10, 2023

(87) PCT Pub. No.: WO2022/172031
PCT Pub. Date: Aug. 18, 2022

(65) Prior Publication Data

US 2024/0134084 A1 Apr. 25, 2024
US 2024/0230947 A9 Jul. 11, 2024

(30) Foreign Application Priority Data

Feb. 15, 2021 (GB) ..................................... 2102115

(51) Int. Cl.
*G21K 1/30* (2026.01)
*G01V 7/02* (2006.01)

(52) U.S. Cl.
CPC *G01V 7/02* (2013.01); *G21K 1/30* (2026.01)

(58) Field of Classification Search
CPC ................................ G01V 7/02; G21K 1/006
See application file for complete search history.

(56) References Cited

U.S. PATENT DOCUMENTS 9,134,450 B2 * 9/2015 Desruelle ................. G01V 7/14

FOREIGN PATENT DOCUMENTS

CN 111897024 A * 11/2020 ............... G01V 7/00
CN 111751894 B * 10/2022 ............... G01V 7/02
(Continued)

OTHER PUBLICATIONS

Altin, P. A., et al. "Precision atomic gravimeter based on Bragg diffraction." New Journal of Physics 15.2 (2013):023009. https://iopscience.iop.org/article/10.1088/1367-2630/15/023009.
International Search Report and Written Opinion issued in App. No. PCT/GB2022/050384, dated May 3, 2022, 10 pages.
(Continued)

*Primary Examiner* — Jamel E Williams
(74) *Attorney, Agent, or Firm* — Blueshift IP; Robert Plotkin

(57) ABSTRACT

An apparatus for generating vertically separated atom clouds. The apparatus comprises an optical system comprising an arrangement of lenses and optics. The optical system is configured to trap and cool atoms to form a cold atom cloud; select the hyperfine level of the atoms; trap atoms of the cold atom cloud in a standing wave optical lattice; and vertically split the cold atom cloud into a high cold atom cloud and a low cold atom cloud. The splitting comprises splitting the cold atom cloud into two clouds by launching atoms of the cold atom cloud in opposite directions to form a high cold atom cloud and a low cold atom cloud, and catching the low cold atom cloud up to reach the same velocity as the high cold atom cloud.

15 Claims, 6 Drawing Sheets

(56) References Cited

FOREIGN PATENT DOCUMENTS

| | | | | | |
|---|---|---|---|---|---|
| EP | 3037849 | A1 | | 6/2016 | |
| WO | 2014106811 | | | 7/2014 | |
| WO | WO-2014106811 | A2 | * | 7/2017 | ............... G01V 7/04 |

OTHER PUBLICATIONS

Search Report issued in App. No. GB2102115, dated Jul. 27, 2021, 3 pages.

* cited by examiner

200

Split and launch

Δν (MHz)
7
0.1
0
t (ms)
502
504
±8ħk
16ħk
separation
acceleration
catching
launching
interrogation
I (%)
100
0
506
t (ms)
10
0.2
50
2
2
0.02
100

500

PREPARATION OF COLD ATOM CLOUDS FOR MEASURING GRAVITY GRADIENT

This present application provides disclosures relating to gravity gradiometers, in particular, the preparation of cold atom clouds for interrogation by the gravity gradiometers.

BACKGROUND

An aim of a gravity gradiometer is to detect a spatial rate of change in gravitational acceleration. This has many useful applications, for example, in aiding navigation by submarines or ships or performing gradiometry surveying in the fields of seismology, geology, geophysics, civil engineering and mineral exploration.

For example, submarines and ships use gravity gradiometers for inertial navigation. The gravity gradiometers are used to ensure safe navigation and accurate detection of underwater objects. Gravity gradiometers also allow more accurate navigation via map matching. It is advantageous for submarines to use gravity gradiometry because it enables covert navigation as a gravity gradiometer does not emit energy and therefore does not compromise a submarine's position, unlike using sonar technology. Moreover gravity gradiometers enable ships to continue operation even when there is poor satellite coverage. The only commercially deployable gravity gradiometer, as used in submarines, is the full-tensor gravity gradiometer (FTG) developed by Lockheed Martin™. This gravity gradiometer is a mechanical instrument, which includes rotating discs with accelerometers to sense accelerations in the X, Y, and Z directions and detect a relative gradient.

It is in the above context that the present disclosure has been devised.

BRIEF SUMMARY OF THE DISCLOSURE

The size and weight of the FTG is too big to be lifted manually. There are other gravity gradiometers that are developed in laboratories, like the Superconducting Gravity Gradiometer (SGG) and the Electrostatic Gravity Gradiometer (EGG), which are realised for satellite measurements in microgravity and can only work in microgravity, or the Differential Free-Fall Gradiometer (DFFG) based on optical gravimeters, which cannot be used in mobile applications. However, none of these instruments are suitable for use in a commercial application.

As an alternative to a mechanical gravity gradiometer, a gravity gradiometer may use the quantum property of matter to measure inertial forces. Cold atom gradiometers measure the freefalling of cold atoms using interferometry. In order to prepare the atoms for measurement, including preparing the two separate clouds, and to perform the interferometry, the gradiometer needs to be large in size to accommodate the equipment for all the stages that lead to measurement and the measurement stage itself and to allow space for the cold atoms to free fall. However, cold atom gradiometers enable the measurement of absolute gravity and gravity gradient and are therefore advantageous over the relative gradient measured by the FTG.

Viewed from one aspect, the present disclosure provides an apparatus for generating vertically separated atom clouds. The apparatus comprises an optical system comprising an arrangement of lenses and optics. The optical system is configured to trap and cool atoms to form a cold atom cloud; select the hyperfine level of the atoms; trap atoms of the cold atom cloud in a standing wave optical lattice; and vertically split the cold atom cloud into a high cold atom cloud and a low cold atom cloud. The splitting comprises splitting the cold atom cloud into two clouds by launching atoms of the cold atom cloud in opposite directions to form a high cold atom cloud and a low cold atom cloud, and catching the low cold atom cloud up to reach the same velocity as the high cold atom cloud.

In consideration of the context of the above background, the inventors have come to the surprising realisation that cold atom gradiometers can be simplified in their design and reduced in size considerably by adapting the steps needed to prepare the atoms for measurement by implementing the present invention.

In particular, by vertically splitting a single cold atom cloud into a high cold atom cloud and a low cold atom cloud, the apparatus only needs to receive a single source of atoms in order to generate vertically separated clouds for interrogation. The present invention enables a single source of atoms to be converted into two cold atom clouds moving at the same velocity at the same time such that these clouds can be interrogated to provide the spatial rate of change in gravitational acceleration. As the present invention only requires the receipt of a single source of atoms to prepare the cold atom clouds, there is considerably less equipment needed to prepare the cold atom clouds and the atoms occupy less space during preparation and therefore the size of the gradiometer can be reduced. For example, as there is only one source of atoms, only one source of atoms needs to be cooled and trapped. The reduction in size makes a gravity gradiometer having the present invention easier to transport and stow. Thus, the present invention realises gradiometric survey with a compact and robust system, using a single source of atoms.

By splitting a cloud, two clouds can be generated from one. Generating two clouds from a single cloud cancels the atom number fluctuations between the two clouds, enabling the gradiometric measurement to be more accurate. Moreover, whilst generating two clouds from a single cloud may increase the cycle time, by splitting the cold atom cloud into two clouds by launching atoms of the cold atom cloud in opposite directions to form a high cold atom cloud and a low cold atom cloud, and catching the low cold atom cloud up to reach the same velocity as the high cold atom cloud, the time taken for the two clouds to be ready to be interrogated to find the gravity gradient is reduced and therefore the clouds can be interrogated sooner. Thus, the splitting, launching and catching of the clouds is highly efficient. The present invention therefore is able to efficiently realise accurate gradiometric measurement.

By shielding the instrument and by vertically orienting the laser beams, the cold atom clouds can be sensitive to only vertical acceleration. Performing this operation on two different clouds vertically separated and interrogated by the same laser, enables extraction of the vertical gravity gradient, which has the advantage of removing the common mode noise. This enables the provision of accurate results and enhances the system robustness.

Thus, the present invention realises a compact and efficient absolute gravity gradiometer.

The atoms to be cooled may be Rubidium 87 atoms.

The atoms may be cooled using a three dimensional magneto optic trap, 3D MOT.

The 3D MOT may be a pyramidal MOT.

The optical system may comprise a plurality of laser frequencies configured to produce laser beams directed in a plurality of directions, and wherein the laser beams interfere to form a standing wave optical lattice.

Launching atoms of the cold atom cloud in opposite directions may comprise creating a frequency shift between two of the laser beams to cause the standing wave to become a moving lattice and retro-reflecting the two laser beams to create two symmetrical moving lattices moving in opposite direction and a standing lattice, the two symmetrical moving lattices being the two clouds.

The at least two laser beams may be blue shifted by about 50 GHz from the Rubidium 87 D2 transition.

The at least two laser beams of the plurality of laser beams may be configured to cause the moving wave to travel by chirping the frequency difference of the at least two laser beams from about 0 to at least 3 MHz.

The hyperfine levels are selected using a microwave transition.

Vertically splitting the cold atom cloud may further comprise splitting the cold atom cloud into two clouds by applying a Bragg pulse before atoms of the cold atom cloud as split into the two clouds are launched. The use of a Bragg pulse may improve the populations of atoms in the separated clouds.

Vertically splitting the cold atom cloud may further comprise decelerating the high cold atom cloud.

The low and high cold atom clouds are measured when they are at the same velocity and therefore the speed of the high atom cloud is limited by the low atom cloud. By decelerating the high cold atom cloud, the cloud can initially be launched at a higher speed and caught, rather than having to wait for gravity to slow the upward-travelling high cloud to the same velocity as the caught low cloud. This reduces the time taken for the clouds to be ready for measurement. Thus, deceleration of the high atom cloud speeds up the preparation of the clouds for measurement, resulting in a shorter preparation time because the time between trapping and cooling the atoms and catching the low cold atom cloud up to reach the same velocity as the high atom cloud is reduced.

After vertically splitting the cold atom cloud, the optical system may be further configured to apply a further velocity shift to the high atom cloud and low atom cloud separately to launch the high atom cloud and low atom cloud upwards in the same direction with the same velocity in advance of a measurement period.

The further velocity shift increases the time period in which the high atom cloud and low atom cloud can be interrogated, which increases the likelihood of obtaining an accurate result from interrogation.

After vertically splitting the cold atom cloud, the optical system is further configured to apply a further velocity shift to the high atom cloud and/or low atom cloud by creating a frequency shift between two of the laser beams to cause the standing wave to become a moving lattice having a velocity matching the atom cloud to be velocity shifted, and chirping the frequency difference in order to apply a velocity shift to the atom cloud. In this way a velocity shift can be applied to catch the low atom cloud (so that it can be held to later match the velocity of the high atom cloud to allow measurement), decelerate the high atom cloud (to reduce the cycle time), or to separately to launch the high atom cloud and low atom cloud upwards in the same direction with the same velocity in advance of a measurement period (to lengthen the interrogation period).

Viewed from another aspect, the present disclosure provides a gravity gradiometer. The gravity gradiometer comprises an apparatus according to the present invention. The optical system is further configured to launch the high cold atom cloud and low cold atom cloud in the same direction with the same velocity; perform Raman interrogation of the two clouds simultaneously; and detect the atomic states of each cloud by fluorescence to find the gravity gradient.

Viewed from another aspect, the present disclosure provides a method for generating vertically separated atom clouds. The method comprises trapping and cooling atoms to form a cold atom cloud; selecting the hyperfine level of the atoms; trapping atoms of the cold atom cloud in a standing wave optical lattice; and vertically splitting the cold atom cloud into a high cold atom cloud and a low cold atom cloud. The splitting comprises splitting the cold atom cloud into two clouds by launching atoms of the cold atom cloud in opposite directions to form a high cold atom cloud and a low cold atom cloud, and catching the low cold atom cloud up to reach the same velocity as the high cold atom cloud.

It will be appreciated from the foregoing disclosure and the following detailed description of the examples that certain features and implementations described as being optional in relation to any given aspect of the disclosure set out above should be understood by the reader as being disclosed also in combination with the other aspects of the present disclosure, where applicable. Similarly, it will be appreciated that any attendant advantages described in relation to any given aspect of the disclosure set out above should be understood by the reader as being disclosed as advantages of the other aspects of the present disclosure, where applicable. That is, the description of optional features and advantages in relation to a specific aspect of the disclosure above is not limiting, and it should be understood that the disclosures of these optional features and advantages are intended to relate to all aspects of the disclosure in combination, where such combination is applicable.

BRIEF DESCRIPTION OF THE DRAWINGS

Embodiments of the invention are further described hereinafter with reference to the accompanying drawings, in which.

DETAILED DESCRIPTION

The present disclosure describes an apparatus for generating vertically separated atom clouds. The apparatus comprises an optical system comprising an arrangement of lenses and optics. The optical system is configured to trap and cool atoms to form a cold atom cloud; select the hyperfine level of the atoms; trap atoms of the cold atom cloud in a standing wave optical lattice; and vertically split the cold atom cloud into a high cold atom cloud and a low cold atom cloud. The splitting comprises splitting the cold atom cloud into two clouds by launching atoms of the cold atom cloud in opposite directions to form a high cold atom cloud and a low cold atom cloud, and catching the low cold atom cloud up to reach the same velocity as the high cold atom cloud.

Figure 1A:
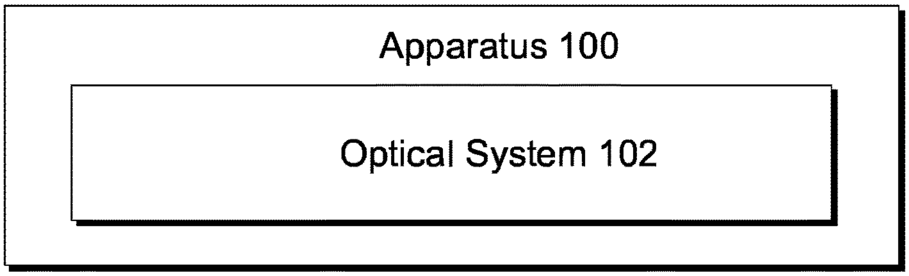
FIG. 1A provides an apparatus according to an example.
Figure 1B:
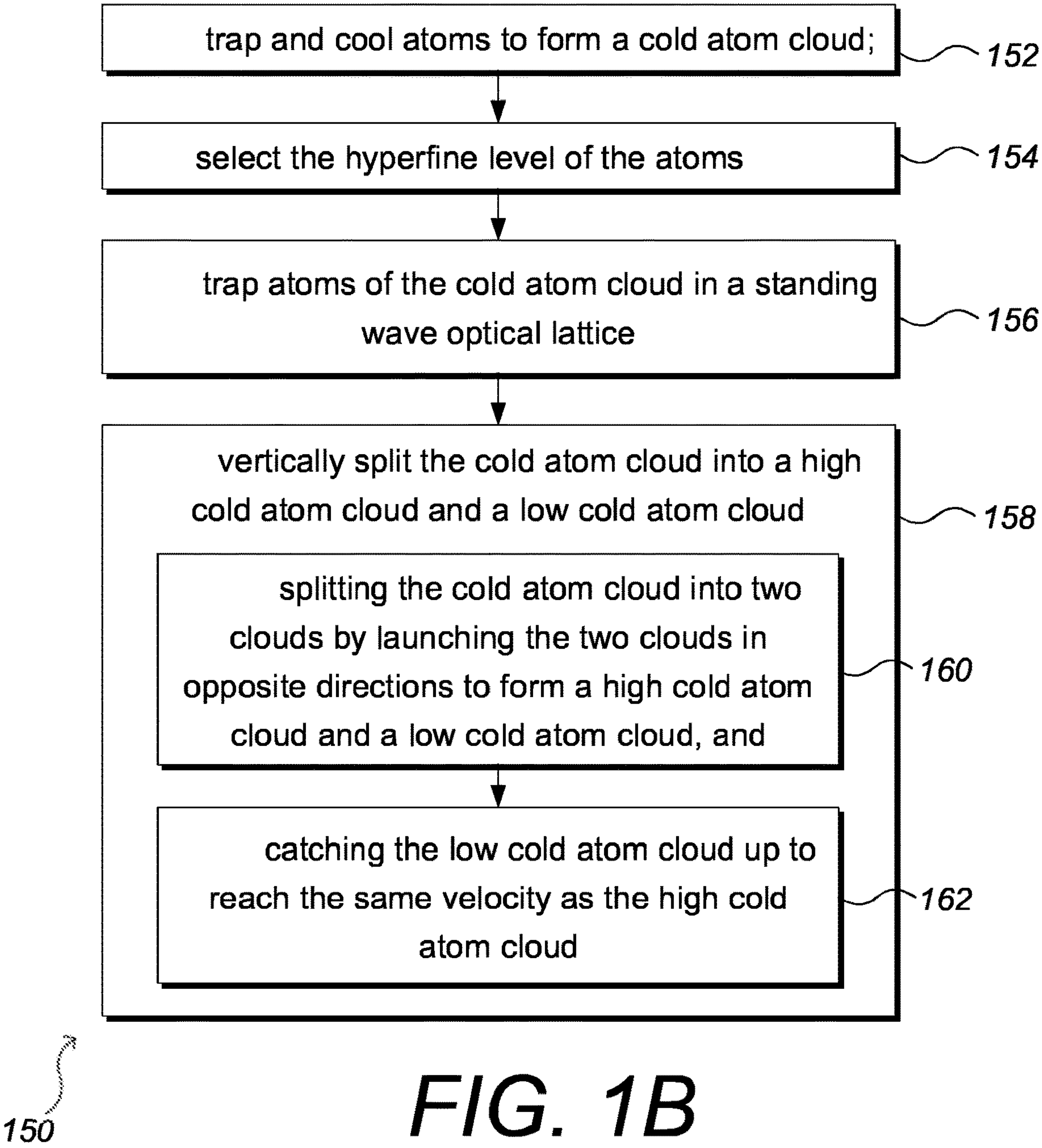
FIG. 1B provides an example flowchart of a method to be performed by an apparatus according to an example.

FIG. 1A provides an apparatus 100 according to an example. The apparatus 100 comprises an optical system 102 comprising an arrangement of lenses and optics. FIG. 1B provides an example flowchart of a method 150 to be performed by an apparatus according to an example. In an example, the method 150 of the flowchart of FIG. 1B is to be performed by the apparatus 100 of FIG. 1A.

Referring to FIG. 1B, the optical system 102 is configured to trap and cool 152 atoms to form a cold atom cloud; select 154 the hyperfine level of the atoms; trap 156 atoms of the cold atom cloud in a standing wave optical lattice; and vertically split 158 the cold atom cloud into a high cold atom cloud and a low cold atom cloud. The splitting 158 comprises splitting 160 the cold atom cloud into two clouds by launching atoms of the cold atom cloud in opposite directions to form a high cold atom cloud and a low cold atom cloud and catching 162 the low cold atom cloud up to reach the same velocity as the high cold atom cloud.

Figure 2:
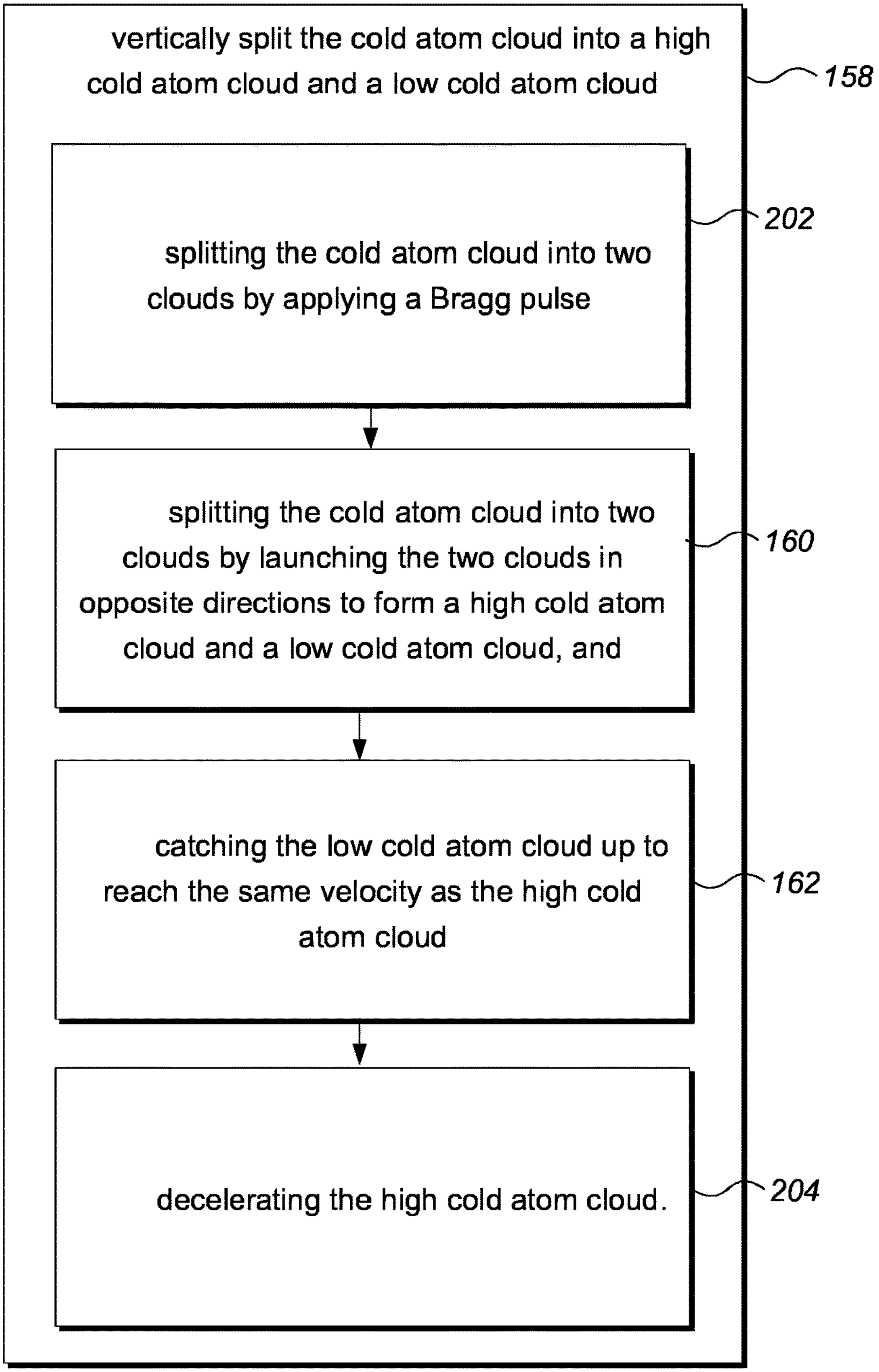
FIG. 2 provides another example flowchart of a method to be performed by an apparatus according to an example.

FIG. 2 provides another example flowchart of a method 200 to be performed by an apparatus according to an example. FIG. 2 provides further steps that may be performed as part of vertically splitting 158 the cold atom cloud into a high cold atom cloud and a low cold atom cloud by the apparatus. In this method 200, the splitting 158 comprises splitting 160 the cold atom cloud into two clouds by launching atoms of the cold atom cloud in opposite directions to form a high cold atom cloud and a low cold atom cloud, and catching 162 the low cold atom cloud up to reach the same velocity as the high cold atom cloud, as described above with reference to FIG. 1B. In FIG. 2, the splitting 158 further comprises splitting 202 the cold atom cloud into two clouds by applying a Bragg pulse before spatially separating them by launching 160. In FIG. 2, the splitting 158 also further comprises decelerating 204 the high cold atom cloud after both clouds have been formed.

In order for the spatially separated atom clouds to be used for a gravity gradiometry interrogation, they must be at the same velocity. By decelerating the high atom cloud, the cloud can be launched at a higher speed and caught, rather than having to wait for gravity to slow the upward-travelling high cloud to the same velocity as the caught low cloud, reducing the time taken for the clouds to be ready for measurement. Thus, this step speeds up the system and results in a shorter preparation time because the time between trapping and cooling the atoms and catching the low cold atom cloud up to reach the same velocity as the high atom cloud is reduced.

Figure 3:
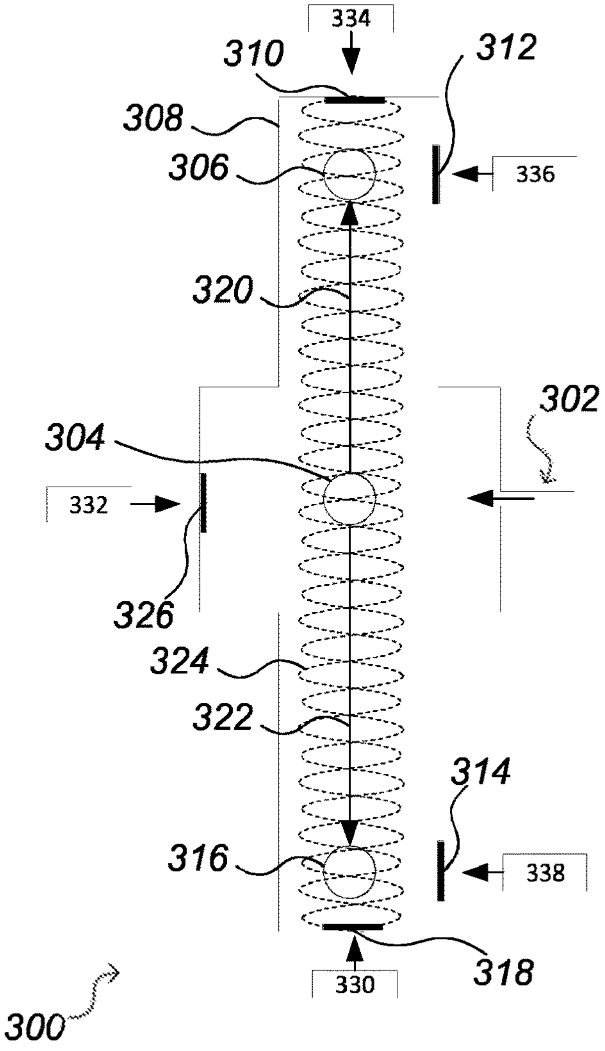
FIG. 3 provides an apparatus according to another example.

The method of FIG. 1B, and the splitting of FIG. 2, will be further explained with reference to FIG. 3. FIG. 3 provides an apparatus 300 according to an example. In an example, the apparatus 300 of FIG. 3 may be the same as the apparatus 100 of FIG. 1A. In an example, the method 150 of the flowchart of FIG. 1B and/or the method 200 of the flowchart of FIG. 2 are to be performed using the apparatus 300 of FIG. 3.

As shown in FIG. 3, the apparatus 300 may include a chamber 308, which may be a vacuum chamber. FIG. 3 shows a cross section of such a chamber 308. As the clouds when measured are vertically separated, the chamber 308 may be orientated in use so that the lower part of the chamber as illustrated is closer to the ground than the higher part. The chamber may be positioned substantially vertically so that the arrows 320 and 322 shown within the chamber 308 illustrate vertical movements.

The vacuum chamber 308 may be made of a single trapping chamber with a top and a bottom tube that contain detection windows 312, 314 at the top and the bottom respectively. There may be top and bottom windows 318, 310 to allow the access of the vertical beams. The windows 318, 310 may be semi-mirrored, or one of them may be mirrored to reflect beams inside the chamber. The trapping area may have a front window 332 and two side windows (not shown). The vacuum chamber may have a low pressure, for example, approximately $10^{-9}$ mbar when in use and $10^{-10}$ mbar when on standby.

The apparatus 300 of FIG. 3 may also comprise coils (not shown) for controlling the magnetic field during the method. As an external magnetic field impacts the gradiometer, a magnetic field may be used to isolate the instrument from the external magnetic field that occurs naturally. A magnetic field may also be used during the MOT, molasses and after the cooling for preparation, launching, interrogation and detection.

The use of apparatus 300 in generating vertically separated atom clouds is as follows.

The atoms may be fed into the middle of the chamber 308 through the inlet 302. The atoms may be directly loaded into the chamber 308 as a vapour. In another embodiment, the atoms may first be loaded into a 2D magneto-optical trap (MOT) (not shown) to slow them down before being loaded into the chamber 308.

The central part of the chamber 308 is where the atoms are trapped and cooled 152. The atoms may be a cloud of Rubidium atoms, such as Rubidium 87 (87Rb) atoms 304. The cloud of atoms 304 may be loaded into a 3D MOT. A 3D MOT is known in the art and will therefore only be briefly described. The 3D MOT cools and traps the atoms of the atom cloud 304 using Doppler cooling. A MOT works by thousands of photons in each of the laser beams imparting momentum to the atoms in different directions which results in a net loss of momentum which slows (and therefore cools) the atoms down. A magnetic field is applied such that the atoms have a spatial dependence to enable the atoms to be trapped. Two coils (not shown) may be used to realise the magnetic field for the MOT.

The magnetic field perturbs the sublevel energies so that atoms further from the field centre have a greater perturbation. Thus, atoms will be pushed towards the centre of the field creating trapped and cooled atoms that form a cold atom cloud. A 3D MOT uses three pairs of counter-propagating laser beams to cool the atoms in three dimensions. A 3D MOT can cool and confine a neutral atom cloud down to temperatures of a few μK with a typical density of $10^{10}$ atoms·cm$^{-3}$. In this example, the cloud may reach a cold temperature of 2 μK after two stages of molasses. The low temperature cloud allows precise measurement of gravity gradients. This is because cooled atoms act as ideal test masses in freefall, which the atoms will be in to measure the gravity gradient.

The 3D MOT may be a pyramidal 3D MOT. In a pyramidal 3D MOT design, a single input beam is split by prisms to achieve three counter-propagating beam pairs. This enables reduction of both the size of the optical delivery system and vacuum chamber, by reducing the number of inputs, and the complexity of the laser system, through not requiring the generation of individual input beams. Further-more, the use of a single input beam results in the real and polarization induced intensity noise being both common-mode between beam pairs. This enables highly stable atom cloud temperatures and enhances the system robustness. The single input beam for use with the 3D MOT may be input into the centre of the chamber 308 via the window 326 from laser 332. In alternative embodiments, there may be more lasers used to cool and trap the atoms.

The optimum temperature for the atoms is lower than 6 μK. To cool the atoms to this temperature, after Doppler cooling with a MOT, the atoms may be cooled by Sisyphus cooling.

After the atoms are trapped and cooled 152, the hyperfine level of the atoms is selected 154. Energy levels may be split into hyperfine levels due to the Zeeman effect. Due to the Zeeman effect, a magnetic interaction of the nuclear magnetic moment with the electron magnetic moment causes a frequency shift in the energy levels of the atom. The magnetic interaction is caused by an external magnetic field which splits the degeneracy of the atoms. The hyperfine level of the atoms is needed for the gradiometer to perform Raman interrogation. This is because the hyperfine splitting induces a wider frequency that reduces the sensitivity to magnetic fields.

The hyperfine level of the atoms may be selected 154 to be located in the non-magnetic sensitive hyperfine level by using a narrow microwave transition, and a magnetic field which generate the vertical bias field to split the degeneracy of the atoms. At least one coil (not shown) may be used to provide the magnetic field for selecting the hyperfine level. To select the level, a microwave pulse may be generated by a microwave antenna (not shown) and transmitted through the centre of the chamber 308 to interact with the cold atom cloud. This pulse generates a narrow microwave transition between the wanted hyperfine level. After the microwave pulse is generated, the remaining atoms in the other hyperfine level are selectively removed by being "blown away" using a blow away beam pulse.

The cold atom cloud 304 is then vertically split 158 within the chamber 308 into a high cold atom cloud 306 and a low cold atom cloud 316. The splitting occurs between cooling and interrogation. To reduce the size of the apparatus 300, the two clouds are generated from a single cloud. The cold atom cloud 304 may be split by launching 160 the atoms of the cold atom cloud 304 in opposite directions to form a high cold atom cloud 306 and a low cold atom cloud 316. However, there may be an additional step before launching 160 of splitting 202 the cold atom cloud 304 in two by applying a Bragg pulse. Including this step results in less atoms being lost during launch and therefore both clouds having a higher population of atoms.

The cloud is split in two and the new clouds are launched vertically in opposite directions using the moving lattice to produce vertically separated cold atom clouds. The clouds are required to be vertically separated so they can be interrogated at separate locations to find the gravity gradient.

Before splitting, an optical lattice may be formed by the partial or full interference of counter propagating laser beams that create a standing wave of a spatially periodic polarization pattern. The resulting periodic potential traps atoms which congregate in the locations of potential minima. Thus, the optical lattice is a periodic array of microtraps for the cold atoms.

A standing wave optical lattice is formed from a plurality of laser beams directed in a plurality of directions and having the same frequency, wherein the laser beams interfere to form the standing wave optical lattice. In the example shown in FIG. 3, the optical system 102 comprises two laser beams of different frequencies, one transmitted downwards from laser 334 through window 334 into chamber 308 and one transmitted upwards from laser 330 through window 318 into chamber 308. Alternatively, the optical system may comprise a single laser beam from a single laser, which is then retroreflected on a mirror (not shown). The beam and retroreflected beam create a standing wave optical lattice.

As mentioned above, there may be an additional step before launching 160 of splitting 202 the cold atom cloud 304 in two by applying a Bragg pulse. Applying a Bragg pulse may cause a two-photons transition inside the same fine level. The transferred atoms can be differentiated by their recoil momentum. To generate the Bragg pulse, the frequency difference between the laser beams generated by lasers 334 and 330 is fixed at a few tenth kHz. The Bragg pulse splits the cloud into two and ensures the atoms are trapped in the moving optical lattice and not the standing lattice.

The splitting by launching the two clouds in opposite directions to form a high cold atom cloud 306 and a low cold atom cloud 316 may use the Bloch elevator method, which moves the optical lattice. That is, the standing wave may travel up the cavity as a moving optical lattice, also known as a Bloch Elevator, to form a high atom cloud. At the same time, the standing wave may also travel down the cavity as a moving optical lattice to form a low cold atom cloud, and the speed of this cloud is increased due to gravity.

To drive the Bloch elevator to launch the atoms of the cold atom cloud in opposite directions to form a high cold atom cloud and a low cold atom cloud, the two laser beams mentioned above are used, one transmitted downwards from laser 334 through window 334 into chamber 308 and one transmitted upwards from laser 330 through window 318 into chamber 308 of the optical system 102. However, to drive the Bloch elevator, the laser beams have different frequencies to each other. This is because the moving lattice is made by providing a frequency difference between the two contra-propagating lasers. The lattice speed depends linearly on the frequency difference. A Bloch elevator can also be made by a single laser with two frequencies and a retro-reflective mirror, resulting in two laser beams of different frequencies directed upwards, and two laser beams of different frequencies directed downwards.

To move the optical lattice vertically in opposite directions using the Bloch elevator method, the frequency difference of the laser beams is increased so that the laser beams no longer have the same frequency. The change in frequency difference causes the lattice to travel up the chamber 308 as shown by arrow 320. At the same time, the lattice also travels down the chamber 308, as shown by arrow 322. Thus, two lattices are formed from one and are launched in opposite directions within the chamber 308. The two moving lattices may be symmetrical. The lattices have trapped atoms and therefore the atoms of the cold atom cloud 304 are split using the moving optical lattices such that the atoms that were trapped in the lattice travelling up the chamber 308 form the high atom cloud 306 and the atoms that were trapped in the lattice travelling down the chamber 308 form the low atom cloud 316.

Once the atoms of the cold atom cloud are launched in opposite directions to form the high and low cold atom clouds, the low cold atom cloud is caught 162 to slow the cloud down so that it can have the same initial velocity as the high atom cloud during measurement. The catching may also occur using the Bloch elevator. The Bloch elevator is operated at a different frequency to catch the low cold atom cloud. This does not catch the high cold atom cloud because at this stage it is traveling in the opposite direction at a different velocity (due to the effects of gravity increasing the downward speed of the low atom cloud, and decreasing the upward speed of the high atom cloud, after launching).

To enable the high cold atom cloud to be launched at a higher speed, the high atom cloud may also be decelerated in addition to the low cold atom cloud being caught. This reduces the time taken for the clouds to be ready for measurement. Thus, decelerating the high cold atom cloud speeds up the system and results in a shorter preparation time because the time between trapping and cooling the atoms and catching the low cold atom cloud up to reach the same velocity as the high atom cloud is reduced. The Bloch elevator may also be operated to decelerate the high cold atom cloud. This does not decelerate the low cold atom cloud because at this stage it is traveling at a different velocity.

Figure 4A:
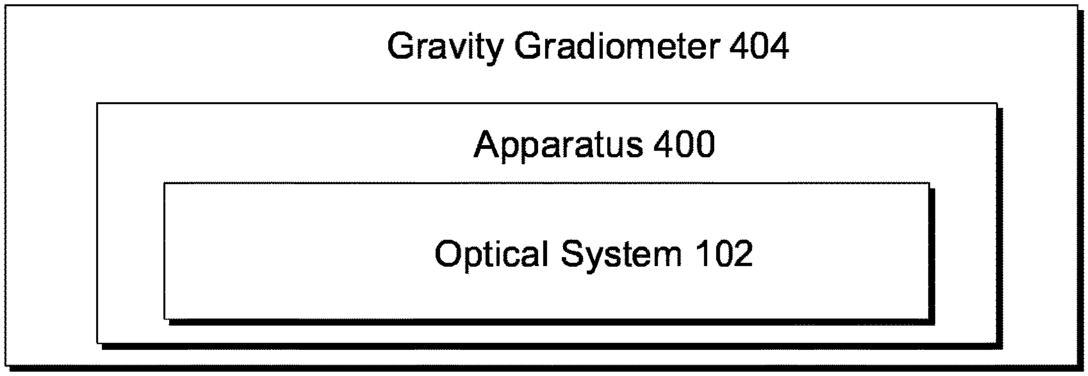
FIG. 4A provides a gravity gradiometer according to an example.
Figure 4B:
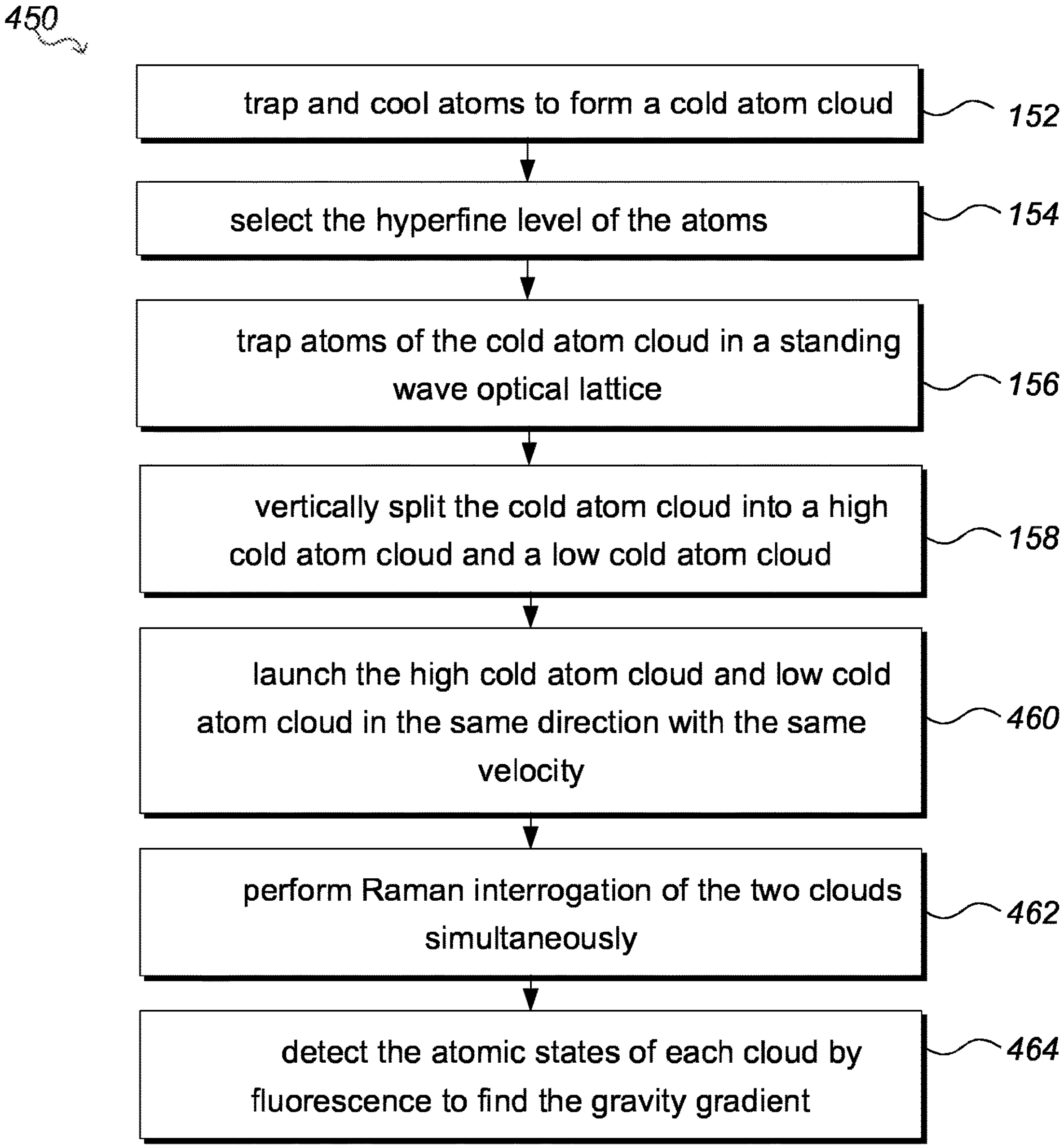
FIG. 4B provides another example flowchart of a method to be performed by a gravity gradiometer according to an example.

FIG. 4A provides a gravity gradiometer 404 according to an example. The gravity gradiometer 404 comprises an apparatus 400 according to the present invention. An example of apparatus 400 is apparatus 100 of FIG. 1A. Apparatus 400 may perform any of the steps of method 150 of FIG. 1B. FIG. 4B provides another example flowchart of a method to be performed by a gravity gradiometer according to an example. This method may be performed by gravity gradiometer 404 of FIG. 4A. The method of FIG. 4A includes the method of FIG. 1B. The method steps 152, 154, 156 and 158 correspond to the method steps 152, 154, 156 and 158 of FIG. 1B. In an example, the method 400 of the flowchart of FIG. 4B is to be performed using the apparatus 300 of FIG. 3, with the method steps 152, 154, 156 and 158 being described above with reference to apparatus 300 of FIG. 3.

Referring to FIG. 4B, the optical system 102 of apparatus 400 may further be configured to launch 460 the high cold atom cloud and low cold atom cloud in the same direction with the same velocity in advance of a measurement period. This is done once the clouds have been launched and the low cold atom cloud caught and, optionally, the high cold atom cloud decelerated. This may occur when the high cold atom cloud is at the apex of its trajectory. Both clouds may be launched by the same moving lattice. The launching may be the provision of a velocity shift to the clouds separately. The launching is to occur before measurement of the clouds to find the gravity gradient.

The clouds need to be travelling at the same velocity for the gravity gradient to be successfully measured. This can be done without launching both clouds in the same direction however, without this step, the interrogation time will be shorter. This is because the two clouds will be observed for longer as they travel up and then down the chamber, rather than just dropping on release. Thus, launching both clouds in the same direction provides a longer interrogation time for the same dropping space available, and so provides a higher sensitivity.

The cold atom clouds are then ready to be measured by the optical system to find the gravity gradient. This is done by first performing 462 Raman interrogation of the two clouds simultaneously and then by detecting 464 the atomic states of each cloud by fluorescence to find the gravity gradient.

The Raman interrogation may be performed by an atom interferometer, for example, a Kasevich-Chu interferometer. To measure gravity, three precisely timed pulses of light are shone onto the cold atoms in freefall, transferring momentum to the cloud and placing the atoms into a quantum superposition of two momentum states. The output state depends on the external force applied on the atoms between the laser pulses.

The first laser pulse, which acts as a splitter, provides precisely half of the atoms with extra momentum which causes the half to travel more quickly through space, splitting the cloud in two so that the cloud of atoms is in a 50/50 quantum superposition state (50% in the ground state and 50% in the excited state). After a free fall time, a second laser pulse, which acts as a mirror, is used to invert the momentum difference of the two clouds, causing them to begin to move towards each other once again and reversing the quantum states. After another free fall time a third and last pulse recombines the atoms in a single state. The laser pulses may be produced by laser 330 or laser 334 of FIG. 3.

During the sequence of pulses, due to gravity, the cloud is accelerated and its velocity increases, which will induce a phase difference. This phase shift can be read be looking at the ratio population between the two states at the output of the interferometer. Measuring the ratio of the population of the two states provides a sensitive measure of gravity because a different gravity induces a different interferometer phase shift.

An interferometer may be used to measure each cold atom cloud. As the two clouds are at different heights, they will receive a different gravitational force. A different gravitational force induces a different interferometer phase shift. Scanning the frequency chirp of the laser during the sequence of pulses enables the scanning of the interferometric phase. The phase ellipse between the two interferometers, one for each cloud, will provide the gravity gradient.

The optical system 102 may then be configured to detect 464 the atomic states of each cloud by fluorescence with a laser beam to find the gravity gradient. This includes detecting by fluorescence the ratio between two hyperfine energy levels. If atoms are excited by the laser beam and move into an upper state, the atoms then emit a photon by fluorescence to move back into a ground state. Thus, the detection by fluorescence detects when atoms emit the photon by fluorescence to move back into the ground state, which provides information on the atomic states of the clouds.

Figure 5:
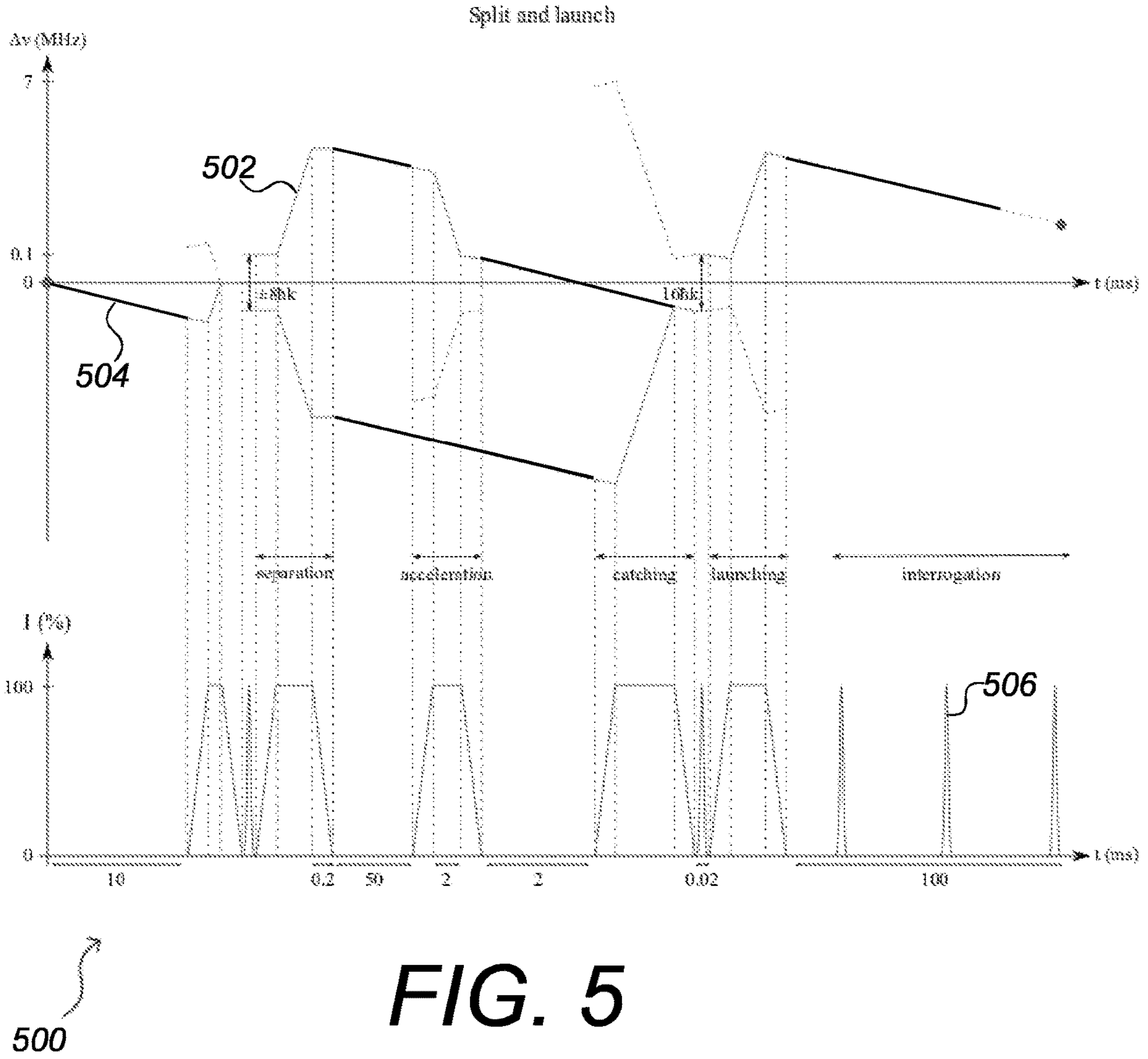
FIG. 5 provides an illustration of a change in velocity of the clouds during a method according to an example.
Figure 6:
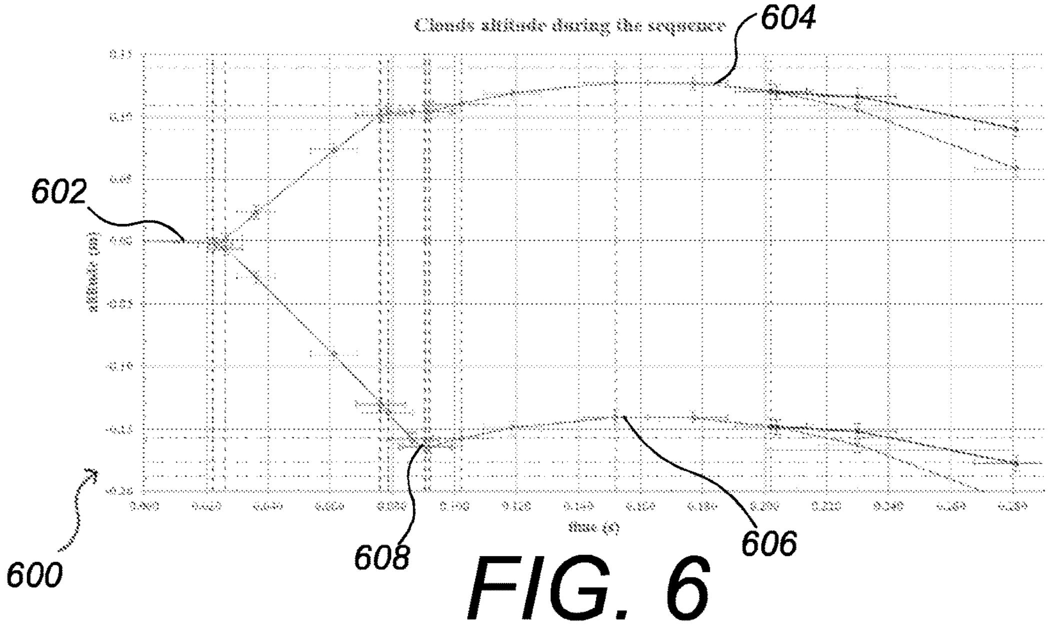
FIG. 6 provides an illustration of a change in altitude of the clouds during a method according to an example.

FIGS. 5 and 6 illustrate the movements of the clouds during the method of FIG. 4B. FIG. 5 provides two graphs, the graph shown in the top pane showing an example of a difference in frequency of the two laser beams for creating the moving lattice to split and move the separated high and low atom clouds. Because of this, the plot of the frequency difference directly correlates to the velocity of the clouds (which are tracked visually in bold lines in the plots) during the method of FIG. 4B. The graph in the bottom pane shows the intensity of the example laser pulses 506 produced by the optical system 102 having the frequency difference shown in the top pane. The bold lines 504 on the first graph indicate the frequency difference of the of the laser needed to track and catch an atom cloud when it is in free fall. The lines not in bold 502 indicate that the frequency difference of the lasers applied by the laser pulses to a cloud being moved by an optical lattice. The dashed lines not in bold indicate the frequency of the counterpropagating moving optical lattice that is not tracking or conveying the opposite atom cloud (as it is moving at a velocity different to the moving optical lattice).

The graphs firstly show the use of the laser in forming an optical lattice and moving the optical lattice to launch and split 158 the atoms of the cold atom cloud 304 into two clouds. The high cold atom cloud 306 is then decelerated 204 using a laser whilst the low cold atom cloud 316 freefalls and both clouds then free fall. The low atom cloud 316 is then caught 162 using a laser to reach the same velocity as the high cold atom cloud 306 and then both atom clouds are launched 460 in the same direction with the same velocity using a laser. The atom clouds are then interrogated by the three laser pulses shown in the second graph to find the gravity gradient.

FIG. 6 provides an illustration of a change in altitude of the clouds during the method of FIG. 4B split and conveyed by the laser beams generated as illustrated in FIG. 5. The first six vertical dashed-lines frame the Bloch elevators. The last three vertical dashed-line represent the Raman pulse. The original cold atom cloud is shown at 602, the high cold atom cloud is shown at 604 and the low cold atom cloud is shown at 606. As can be seen at approximately 0.090 ms, shown at 608, the Bloch elevator launches both atom clouds upwards in the same direction with the same velocity to increase the interrogation time.

Figure 7A:
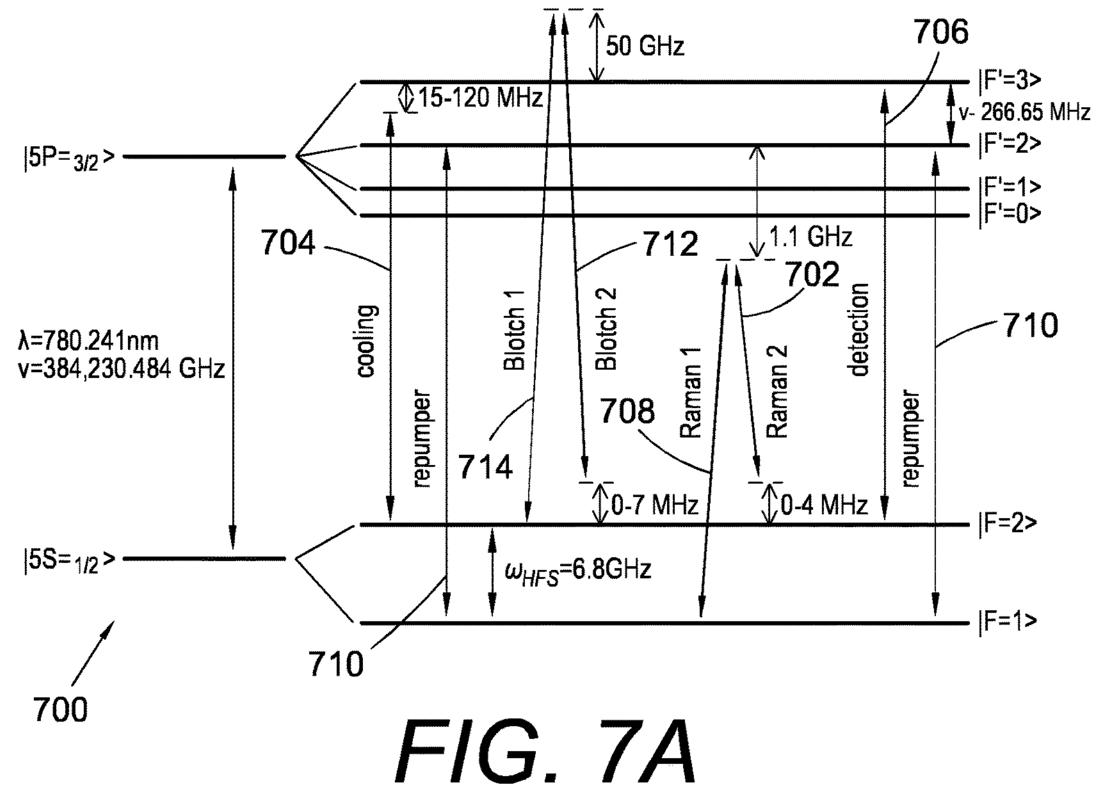
FIG. 7A provides an illustration of the energy levels of an atom of the cloud during a method according to an example.

FIG. 7A provides an illustration of the energy levels of 87Rb atoms during an example of the method 450 of FIG. 4B. FIG. 7A shows the $^{87}$Rb $D_2$ transition hyperfine structure, where the fine levels have a separation of 780 nm and the hyperfine levels have a separation of 6.835 GHz. As illustrated in FIG. 7A, the energy level of 87Rb atoms at ground state is $|5S_{1/2}>$ and the energy level of 87Rb atoms at the first excited state is $|5P_{3/2}>$. The transition shown between the ground state and the first excited state is the $D_2$ transition, which is the transition of interest. FIG. 7A also illustrates the fine (F) levels in the ground state and first excited state, which are caused by the Zeeman effect. For the Zeeman sub-level selection, a microwave pulse is generated by the microwave antenna to address the transition between the two fine levels |F=1> and |F=2>.

Figure 7B:
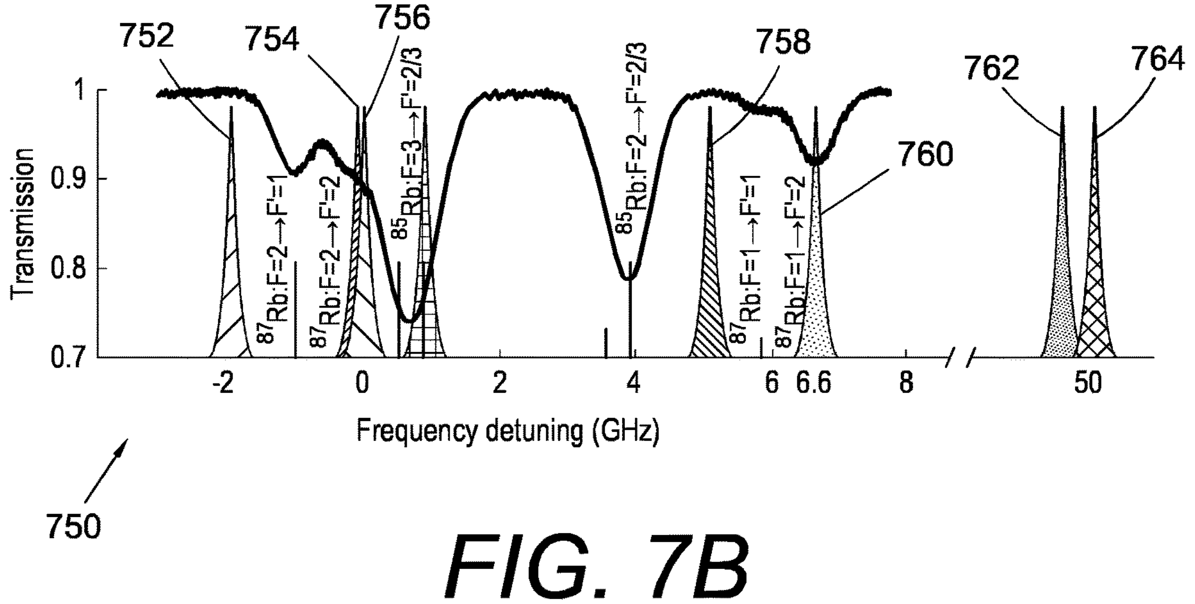
FIG. 7B provides an illustration of the laser frequencies during a method according to an example.

FIG. 7B provides an illustration of the spectroscopy of 87Rb and the laser frequencies used during an example of the method 450 of FIG. 4B.

An example of the method 450 that uses the laser frequencies of FIG. 7B and causes the transitions of FIG. 7A is as follows. In this example, the method steps take place on the 87Rb $D_2$ transition.

Firstly, the atoms are trapped and cooled 152 to form a cold atom cloud. This is done using the cooling laser frequency 754 in FIG. 7B that causes the transition 704 in FIG. 7A. The cooling is generated by addressing the transition $^{87}$Rb |F=2>→|F'=3> with a red shift between 2.5 and 20 $\Gamma$($\Gamma$=6.065 MHz), it is generated by a negative shift of 1.07 GHz from the locking point. To repump the atoms that fall in the level |F=1> a second frequency, of 6.58 GHz is added to reach the transition $^{87}$Rb |F=1>→|F'=2>. This is done using the repumper laser frequency 760 in FIG. 7B that causes the transition 710 in FIG. 7A. In this example, during the MOT step, the magnetic field gradient is set at 12 G/cm by two coils in anti-Helmholtz configuration. During the molasses a zero magnetic field may be needed so a two-layer magnetic shield can be used for a total attenuation of 66 dB.

Next, the hyperfine level of the atoms is selected 154. For the Zeeman sub-level selection, a microwave pulse is generated by the microwave antenna to address the transition between the two hyper fine levels at 6.835 GHz. To split the Zeeman sublevel in the vertical direction bias coils may be used and produce a field of 850 mG.

Next, atoms of the cold atom cloud are trapped 156 in a standing wave optical lattice and the cold atom cloud is vertically split 158 into a high cold atom cloud and a low cold atom cloud. The splitting 158 comprises splitting 160 the cold atom cloud into two clouds by launching atoms of the cold atom cloud in opposite directions to form a high cold atom cloud and a low cold atom cloud. In this example, the launching is done using a Bloch elevator. This is done using the Bloch laser frequencies 762 and 764 in FIG. 7B that cause the transitions 712 and 714 respectively in FIG. 7A.

To generate a Bloch elevator, the frequencies of the at least two laser beams are blue shifted by about 50 GHz from the Rubidium 87 $D_2$ transition. The frequency difference between both is chirped from 0 to a few MHz, for example, to 3 MHz, which generates a moving lattice. The plurality of laser beams may be configured to cause the moving wave to travel by chirping the frequency difference of the at least two laser beams from about 0 to at least 3 MHz.

In this example, the splitting 158 also comprises splitting 202 the cold atom cloud into two clouds by applying a Bragg pulse before the cold atom cloud is split by launching 160. To generate a Bragg pulse the frequency difference of the at least two laser beams remains fixed at a few tenth kHz.

The low cold atom cloud is caught 162 and the high atom cloud decelerated 204 by the Bloch elevator and therefore may use the same laser beams and frequencies used for Bloch elevation. Both clouds are then launched 460 in the same direction with the same velocity also using the Bloch elevator.

Once the atom clouds are travelling at the same velocity in the same direction, Raman interrogation of the two clouds is performed 462 simultaneously. This is done using the Raman laser frequencies 752 and 758 in FIG. 7B that cause the transitions 702 and 708 respectively in FIG. 7A. The Raman interrogation uses a two photon transition red shifted of 0.9 GHz with a frequency difference equal to the hyper fine structure transition (6.8 GHz). This frequency difference is chirped by a few MHz to follow the Earth acceleration. This chirp is swept between each sequence to scan the interferometer phase.

Then the atomic states of each cloud are detected 464 by fluorescence to find the gravity gradient. This is done using the detection laser frequency 756 in FIG. 7B that causes the transition 706 in FIG. 7A. To find the interferometer phase the ratio between the level |F=2> and the level |F=1> is detected by fluorescence. These levels are read by using the transition $^{87}$Rb |F=2>→|F'=3> and $^{87}$Rb |F=1>→|F'=2>.

All the transitions needed for the method (except the microwave transition) are generated with a laser beam at 780 nm. The full range of the frequencies is 53 GHz, 110 pm. A plurality of lasers are used to generate the necessary frequencies.

In summary, there is provided an apparatus 100 for generating vertically separated atom clouds. The apparatus 100 comprises an optical system 102 comprising an arrangement of lenses and optics. The optical system is configured to trap and cool 152 atoms to form a cold atom cloud 304; select 154 the hyperfine level of the atoms; trap 156 atoms of the cold atom cloud 304 in a standing wave optical lattice; and vertically split 158 the cold atom cloud 304 into a high cold atom cloud 306 and a low cold atom cloud 316. The splitting 158 comprises splitting 160 the cold atom cloud 304 into two clouds by launching atoms of the cold atom cloud 304 in opposite directions to form a high cold atom cloud 306 and a low cold atom cloud 316, and catching 162 the low cold atom cloud 316 up to reach the same velocity as the high cold atom cloud 306.

Throughout the description and claims of this specification, the words “comprise” and “contain” and variations of them mean “including but not limited to”, and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. In particular, any dependent claims may be combined with any of the independent claims and any of the other dependent claims.

The invention claimed is:

1. Apparatus for generating vertically separated atom clouds, the apparatus comprising an optical system comprising an arrangement of lenses and optics, the optical system configured to:
- trap and cool atoms to form a cold atom cloud;
- select the hyperfine level of the atoms;
- trap atoms of the cold atom cloud in a standing wave optical lattice;
- vertically split the cold atom cloud into a high cold atom cloud and a low cold atom cloud, the splitting comprising:
  - splitting the cold atom cloud into two clouds by launching atoms of the cold atom cloud in opposite directions to form a high cold atom cloud and a low cold atom cloud, and
  - catching the low cold atom cloud up to reach the same velocity as the high cold atom cloud.

2. An apparatus according to claim 1, wherein the atoms to be cooled are Rubidium 87 atoms.

3. An apparatus according to claim 1 or claim 2, wherein the atoms are cooled using a three dimensional magneto optic trap, 3D MOT.

4. An apparatus according to claim 3, wherein the 3D MOT is a pyramidal MOT.

5. An apparatus according to claim 1, wherein the optical system comprises a plurality of laser frequencies configured to produce laser beams directed in a plurality of directions, and wherein the laser beams interfere to form a standing wave optical lattice.

6. An apparatus according to claim 5, wherein launching atoms of the cold atom cloud in opposite directions comprises creating a frequency shift between two of the plurality of laser beams to cause the standing wave to become a moving lattice and retro-reflecting the two of the plurality of laser beams to create two symmetrical moving lattices moving in opposite direction and a standing lattice, the two symmetrical moving lattices being the two clouds.

7. An apparatus according to claim 6, wherein at least two laser beams of the plurality of laser beams are blue shifted by about 50 GHz from the Rubidium 87 D2 transition.

8. An apparatus according to claim 5, wherein at least two laser beams of the plurality of laser beams are configured to cause the moving wave to travel by chirping the frequency difference of the at least two laser beams from about 0 to at least 3 MHz.

9. An apparatus according to claim 1, wherein the hyperfine levels are selected using a microwave transition.

10. An apparatus according to claim 1, wherein vertically splitting the cold atom cloud further comprises splitting the cold atom cloud into two clouds by applying a Bragg pulse before the atoms of the cold atom cloud as split into the two clouds are launched.

11. An apparatus according to claim 1, wherein vertically splitting the cold atom cloud further comprises decelerating the high cold atom cloud.

12. An apparatus according to claim 1, wherein, after vertically splitting the cold atom cloud, the optical system is further configured to apply a further velocity shift to the high atom cloud and low atom cloud separately to launch the high atom cloud and low atom cloud upwards in the same direction with the same velocity in advance of a measurement period.

13. An apparatus according to claim 1, wherein, after vertically splitting the cold atom cloud, the optical system is further configured to apply a further velocity shift to the high atom cloud and/or low atom cloud by creating a frequency shift between two of the plurality of laser beams to cause the standing wave to become a moving lattice having a velocity matching the atom cloud to be velocity shifted, and chirping the frequency difference in order to apply a velocity shift to the atom cloud, wherein the velocity shift is to catch the low atom cloud, decelerate the high atom cloud, or to separately to launch the high atom cloud and low atom cloud upwards in the same direction with the same velocity in advance of a measurement period.

14. A gravity gradiometer comprising:
- an apparatus according to claim 1, wherein the optical system is further configured to:
  - launch the high cold atom cloud and low cold atom cloud in the same direction with the same velocity;
  - perform Raman interrogation of the two clouds simultaneously; and
  - detect the atomic states of each cloud by fluorescence to find the gravity gradient.

15. A method for generating vertically separated atom clouds, the method comprising:
- trapping and cooling atoms to form a cold atom cloud;
- selecting the hyperfine level of the atoms;
- trapping atoms of the cold atom cloud in a standing wave optical lattice;
- vertically splitting the cold atom cloud into a high cold atom cloud and a low cold atom cloud, the vertically splitting comprising:
  - splitting the cold atom cloud into two clouds by launching atoms of the cold atom cloud in opposite directions to form a high cold atom cloud and a low cold atom cloud, and
  - catching the low cold atom cloud up to reach the same velocity as the high cold atom cloud.

* * * * *